US012764205B2

(12) United States Patent
Blagodurov et al.

(10) Patent No.: US 12,764,205 B2
(45) Date of Patent: Oct. 13, 2026

(54) HARDWARE ASSISTED ATOMICS SUPPORT IN DATACENTER FABRICS

(71) Applicant: Advanced Micro Devices, Inc., Santa Clara, CA (US)

(72) Inventors: Sergey Blagodurov, Bellevue, WA (US); Brandon K. Potter, Austin, TX (US); Furkan Eris, Santa Clara, CA (US); Bradford Beckmann, Bellevue, WA (US); Khaled Hamidouche, Austin, TX (US); Kishore Punniyamurthy, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 137 days.

(21) Appl. No.: 18/604,377

(22) Filed: Mar. 13, 2024

(65) Prior Publication Data

US 2025/0294085 A1 Sep. 18, 2025

(51) Int. Cl.
*H04L 69/22* (2022.01)
*H04L 41/14* (2022.01)

(52) U.S. Cl.
CPC .............. *H04L 69/22* (2013.01); *H04L 41/14* (2013.01)

(58) Field of Classification Search
CPC ................................ H04L 69/22; H04L 41/14
See application file for complete search history.

(56) References Cited

U.S. PATENT DOCUMENTS

| | | | | |
|---|---|---|---|---|
| 6,789,143 B2 * | 9/2004 | Craddock | G06F 9/546 | 710/52 |
| 6,917,987 B2 * | 7/2005 | Parthasarathy | H04L 69/329 | 709/249 |
| 6,948,004 B2 * | 9/2005 | Gasbarro | H04L 49/90 | 709/225 |
| 7,631,128 B1 * | 12/2009 | Sgrosso | H04L 49/557 | 710/36 |
| 7,707,367 B1 * | 4/2010 | Tran | G06F 13/4054 | 710/36 |
| 7,769,928 B1 * | 8/2010 | Tran | G06F 13/387 | 710/61 |
| 7,979,572 B1 * | 7/2011 | Tran | G06F 13/387 | 709/236 |
| 7,979,588 B1 * | 7/2011 | Tran | G06F 13/387 | 709/253 |

(Continued)

OTHER PUBLICATIONS

Lim, K., et al., "Disaggregated Memory for Expansion and Sharing in Blade Servers," ISCA '09: Proceedings of the 36th Annual International Symposium on Computer Architecture, Jun. 2009, pp. 267-278.

(Continued)

*Primary Examiner* — Jimmy H Tran

(74) *Attorney, Agent, or Firm* — Patterson + Sheridan, LLP

(57) ABSTRACT

Embodiments herein describe generating packets that combine an atomic operation (e.g., an atomic fetch) with a data operation (e.g., a put). Previous remote atomics first transmit a packet to a remote node that provides a lock for the data. If the lock is granted, the node transmits another packet containing a data operation which can read or write data. However, the embodiments herein can use a relaxed range-based atomics where the packet uses a range to reserve space in a dataset (e.g., a buffer) at the destination node for the data operation.

17 Claims, 8 Drawing Sheets

(56) References Cited

U.S. PATENT DOCUMENTS

| | | | | |
|---|---|---|---|---|
| 7,987,229 | B1 * | 7/2011 | Kinne | G06F 13/385 709/200 |
| 8,090,789 | B1 * | 1/2012 | O'Shea | H04L 67/1097 709/211 |
| 8,645,623 | B1 * | 2/2014 | O'Shea | G06F 12/0866 711/111 |
| 8,989,180 | B2 * | 3/2015 | Pandit | G06F 15/17331 409/220 |
| 9,262,225 | B2 * | 2/2016 | Davis | H04L 49/15 |
| 9,818,902 | B2 * | 11/2017 | Lim | H10F 10/161 |
| 10,645,019 | B2 * | 5/2020 | Shalev | G06F 15/17331 |
| 10,929,174 | B2 * | 2/2021 | Daglis | G06F 9/528 |
| 11,770,449 | B2 * | 9/2023 | Kotha | H04L 67/1097 709/213 |
| 2002/0141424 | A1 * | 10/2002 | Gasbarro | H04L 49/90 370/412 |
| 2002/0184392 | A1 * | 12/2002 | Parthasarathy | H04L 67/14 709/249 |
| 2003/0061417 | A1 * | 3/2003 | Craddock | G06F 9/546 710/54 |
| 2008/0184392 | A1 * | 7/2008 | Bougri | C12N 15/8282 800/279 |
| 2014/0195631 | A1 * | 7/2014 | Pandit | G06F 13/28 709/212 |
| 2018/0173673 | A1 * | 6/2018 | Daglis | G06F 9/467 |
| 2021/0216473 | A1 * | 7/2021 | Kimura | G06F 16/2379 |
| 2022/0210224 | A1 * | 6/2022 | Kotha | G06F 13/28 |
| 2022/0360465 | A1 * | 11/2022 | Holmberg | H04L 12/1881 |
| 2023/0185478 | A1 * | 6/2023 | Kommareddy | G06F 3/0653 711/118 |
| 2023/0231914 | A1 * | 7/2023 | Belkar | H04L 67/1097 709/212 |
| 2024/0022519 | A1 * | 1/2024 | Shalev | H04L 45/24 |
| 2026/0046317 | A1 * | 2/2026 | Crabtree | H04L 63/104 |

OTHER PUBLICATIONS

CXL. Accessed: Mar. 6, 2024 Compute Express Link. https://computeexpresslink.org/.

Kommareddy, Vamsee Reddy, et al. "Page migration support for disaggregated non-volatile memories." Proceedings of the International Symposium on Memory Systems. 2019.

* cited by examiner

HARDWARE ASSISTED ATOMICS SUPPORT IN DATACENTER FABRICS

TECHNICAL FIELD

Examples of the present disclosure generally relate to performing remote atomics using range-based atomics.

BACKGROUND

Remote atomic operations can establish locks without the intervention of the remote host. This means that lock manager processes are not needed, which can reduce utilization of the CPU. The locks provided by remote atomic operations can be implemented using a communication layer such as the InfiniBand Architecture. In one embodiment, the remote atomic operations are handled by network interface cards/controllers (NIC) (e.g., SmartNICs) in respective nodes or endpoints in a distributed system.

Remote atomics have a direct impact on performance of many distributed applications like artificial intelligence (AI)/machine learning (ML) applications and radix sort. An entire network round-trip latency for an atomic fetch is exposed to the application as performance loss. Additionally, the reliance on remote atomics at the application level prevents optimizations such as the network being able to perform network aggregation.

SUMMARY

One embodiment described herein is a computing system that includes one or more processors and memory storing an application which, when executed by the one or more processors, performs an operation. The operation includes generating a relaxed range for a data operation, generating a packet that combines an atomic operation with the data operation, and transmitting the packet on a network.

Another embodiment described herein is a method that includes generating a relaxed range for a data operation, generating a packet that combines an atomic operation with the data operation, and transmitting the packet on a network.

Another embodiment described herein is a non-transitory computer readable storage medium comprising computer readable program code embodied therewith, the computer readable program code executable by one or more computer processors to perform an operation. The operation includes generating a relaxed range for a data operation, generating a packet that combines an atomic operation with the data operation, and transmitting the packet on a network.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
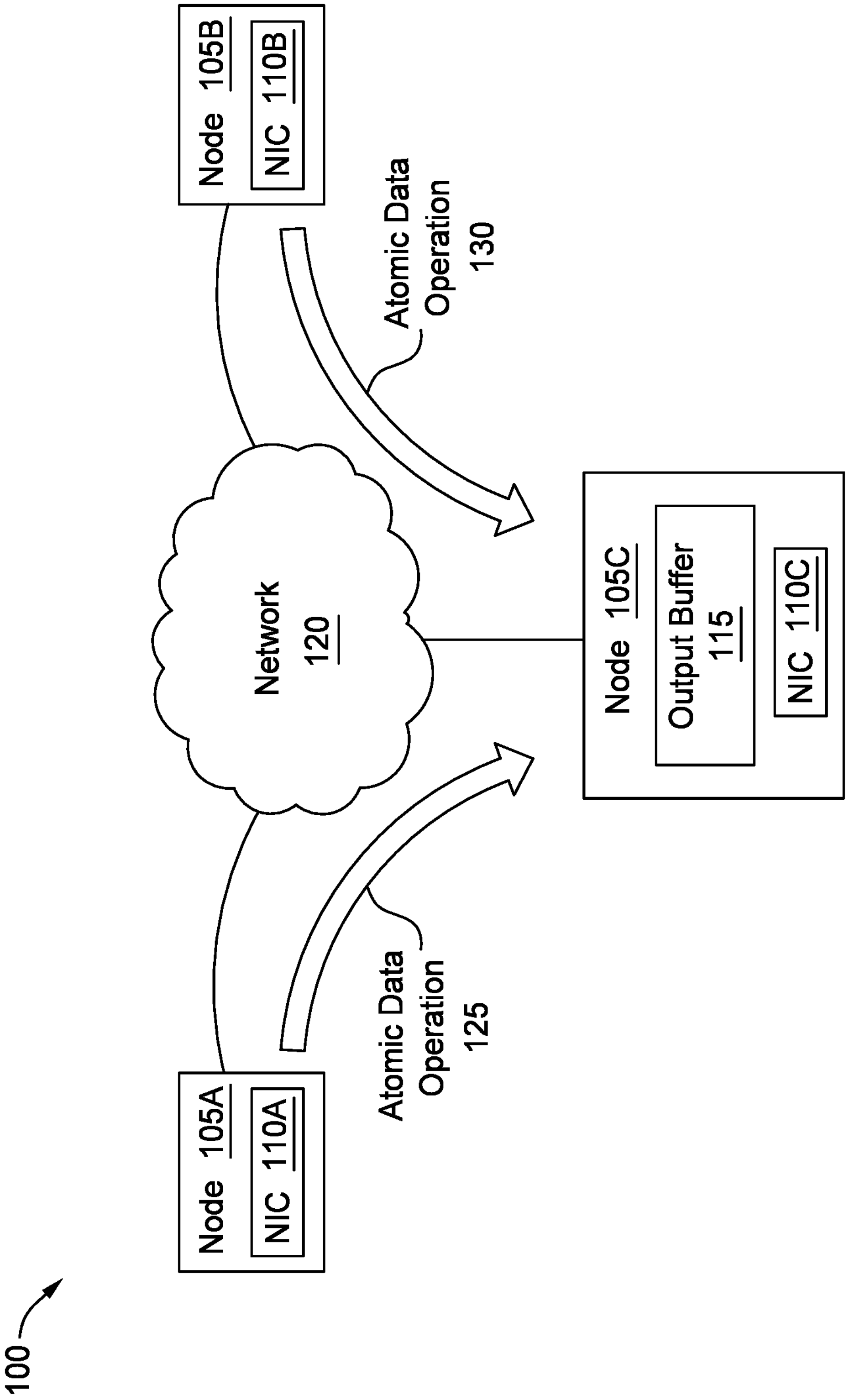
FIG. 1 illustrates a distributed system that uses remote atomics, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe generating packets that combine an atomic operation (e.g., an atomic fetch) with a data operation (e.g., a put). Previous remote atomics first transmitted a packet to a remote node that provides a lock for the data. If the lock is granted or obtained, the node transmits another packet containing a data operation which can read or write data at the destination node. However, the embodiments herein can use relaxed range-based atomics where the packet uses a range to reserve space in a dataset (e.g., a buffer) at the destination node for the data operation. Thus, instead of having to transmit two packets, a requesting node can transmit only one packet to the destination node where, if the atomic operation succeeds, the data operation can be performed. This reduces latency associated with atomic and data operations, which can speed up distributed applications, save power, and reduce network congestion.

In one embodiment, a switch in the network can perform the atomic operation. In that example, a requesting node can transmit the packet that contains the combined atomic and data operation on the network. A centralized switch in the network can detect the packet and perform the atomic operation (e.g., granting the lock to the data set). If the lock is granted, the switch can transmit a packet to the destination node, but strip out (or remove) the atomic operation such that the packet contains only the data operation. This means the atomics for the data set can be offloaded to the switch, which can conserve processing power in the destination node.

FIG. 1 illustrates a distributed system 100 that uses remote atomics, according to an example. The system 100 illustrates multiple nodes 105 that are communicatively coupled via a network 120, which can include any number of switches. The nodes can be part of a distributed operation or application such as an AI/ML application or a radix sort.

The nodes 105 (e.g., computing systems) can each include any number of processors (e.g., central processing units (CPUs)) that can each include any number of processor cores. The nodes 105 can also include memory such as volatile memory, non-volatile memory, and combinations thereof. In this example, the node 105C includes an output buffer 115 which the nodes 105 can store data before it is processed and then output by the node 105C.

The nodes 105 also include respective NICs 110 (e.g., SmartNICs) which facilitate communication with the network 120 and each other. In one embodiment, the NICs 110 include circuitry (e.g., hardware blocks or circuitry) that perform atomic operations. For example, the NIC 110C in the node 105C can perform atomic operations to ensure that data stored in the output buffer 115 received from one node does not corrupt (or "clobber") data that was stored in the output buffer 115 by another node.

FIG. 1 illustrates the node 105A transmitting an atomic data operation 125 to the node 105C and the node 105B transmitting an atomic data operation 130 to the node 105C. In this example, it is assumed that the atomic data operation 125 is received first at the node 105C. Without atomic operations, the data contained in the operation 125 may be first written into the output buffer 115 and then the data contained in the operation 130 may then be written in the same memory location in the output buffer 115 which would "clobber" the data corresponding to the operation 125. However, remote atomics are used to prevent the atomic data operations 125 and 130 from having the same memory locations. In one embodiment, the operations 125 and 130 are assigned different memory offsets by an atomic operation performed by the NIC 110 so that the associated data is stored at different memory locations in the output buffer 115 (which may be a circular buffer).

In the embodiments herein, the order in which the data containing the atomic data operations 125 and 130 in the output buffer 115 does not matter, so long as the data is given unique spots to prevent subset clobbering. Current atomic operations require a programmer to interface with atomics at the remote node where the data set (e.g., the output buffer 115) resides. Ideally, the application programmer only wants to specify some requirements and then transfer the data.

In one embodiment, to abstract away the atomic operations, the atomic data operations 125 and 130 can include relaxed ranges that specify a beginning point (a base (or start)) address and an end address for the data being stored or retrieved from the output buffer 115. This operation resolves both the atomic operation (e.g., an atomic fetch) and a data operation (e.g., a put operation) in a single call. This call can be put in a packet (e.g., the atomic data operations 125 and 130) and transmitted on the network 120. The NIC 110C on the node 105C can perform the atomic fetch (as discussed below), and if the lock is granted, perform the put operation. This advantageously avoids a round-trip in the network 120 compared to current solutions where a node first transmits a packet containing the atomic fetch, waits to get a response from the destination node and then transmits a packet containing the put operation to the destination node.

Figure 2:
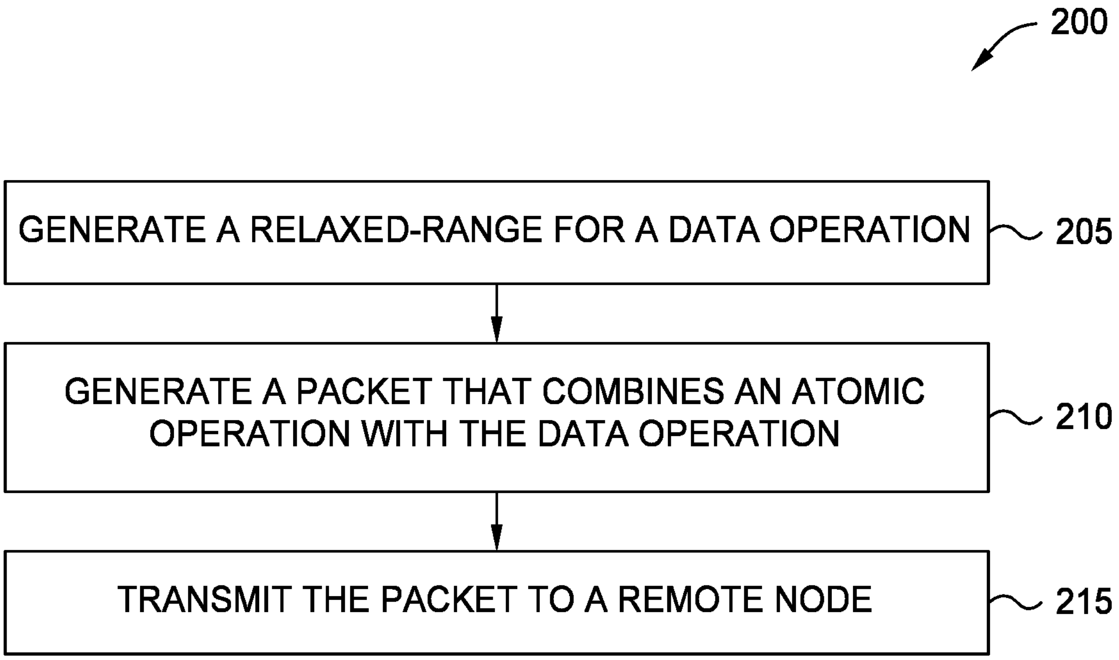
FIG. 2 is a flowchart for using range-based operations to combine atomic and data operations into a packet, according to an example.

FIG. 2 is a flowchart of a method 200 for using range-based operations to combine atomic and data operations into a packet, according to an example. At block 205, a requesting node generates a relaxed range for a data operation. In one embodiment, the relaxed range includes a beginning address and an ending address related to the size of the data corresponding to the data operation (e.g., how much data is being written into the data set at the destination node, or how much data is being requested from the destination node). In one embodiment, the range could be a tuple that includes a destination base address, a destination end address, and an ID of the destination node (also referred to as a processing element (PE)).

At block 210, the requesting node generates a packet that combines an atomic operation with the data operation. For example, the packet can include data for performing an atomic fetch and a put operation, which stores data in the payload of the packet into a data set in the destination node after achieving a lock. In another embodiment, the packet could include data for atomic and data operations that read data from the data set in the destination node after achieving a lock.

At block 215, the requesting node transmits the packet to the destination node via a network. The destination node can receive the packet and first perform the atomic operation using a NIC. Using an atomic fetch as an example, the NIC may first check whether a lock has already been obtained for the data set by another remote node. For example, the NIC may store a 0 which indicates that there is no current lock on the dataset or a 1 which indicates there is a lock. If there is no lock, the NIC can change the value to a 1 (indicating there is now a lock) and perform the data operation corresponding in the packet, such as storing data in the data set as part of a put operation.

After completing the data operation, the NIC at the destination node may release the lock (e.g., change the value back to a 0) and increment an offset as part of the atomic operation (e.g., the atomic fetch). The offset can indicate where data is to be stored next in the data set. For example, if the put operation stored 1024 bytes in the data set, the NIC can increment the offset by 1024 bytes. Thus, the next time a put operation is received, this data will be stored in the data set using the updated offset so it does not clobber the data stored in the previous put operation. In this manner, the atomic operation updates the offset and prevents data collisions.

Figure 3A:
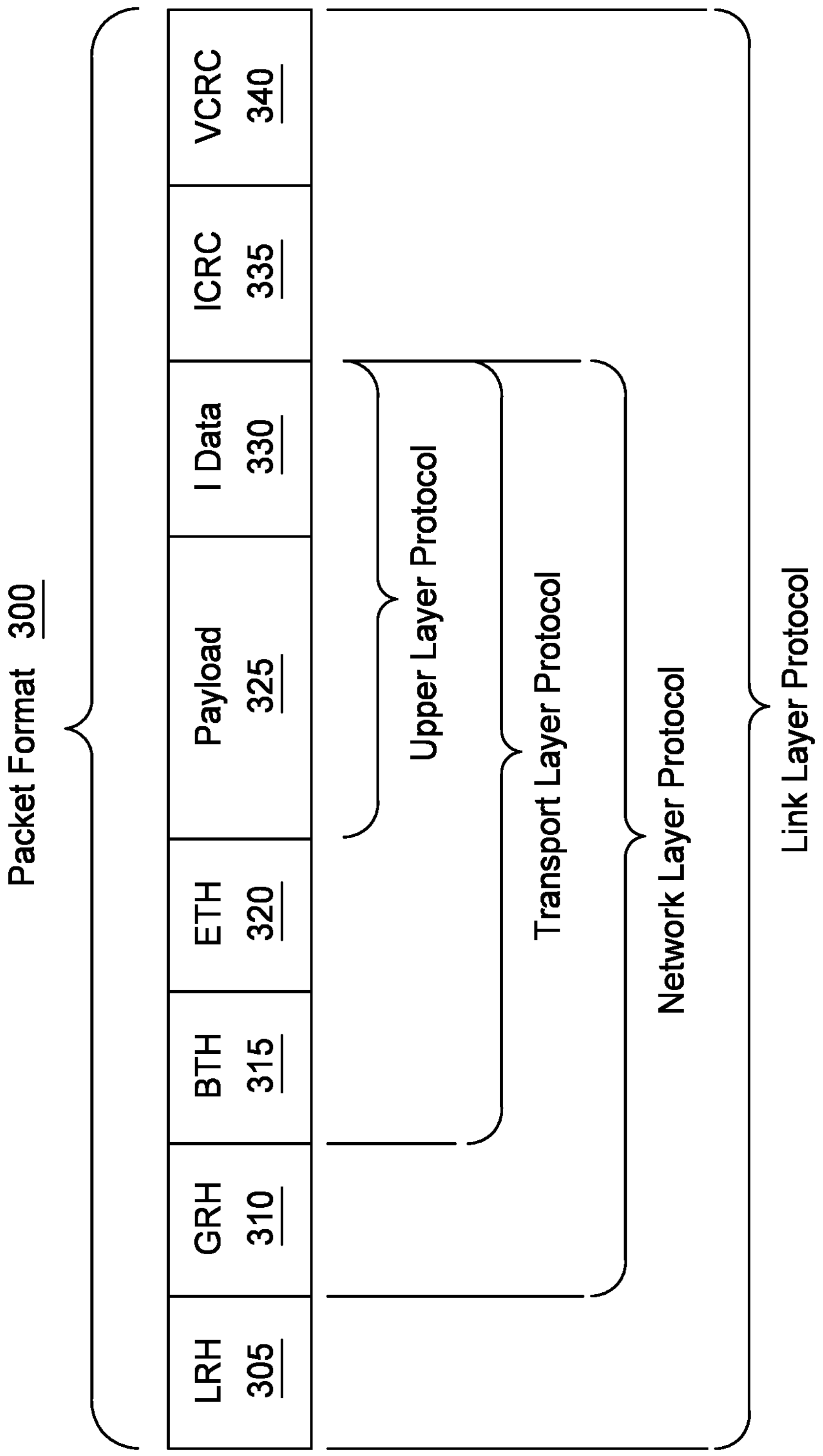
FIGS. 3A and 3B illustrate packet formats that combine atomic and data operations, according to an example.
Figure 3B:
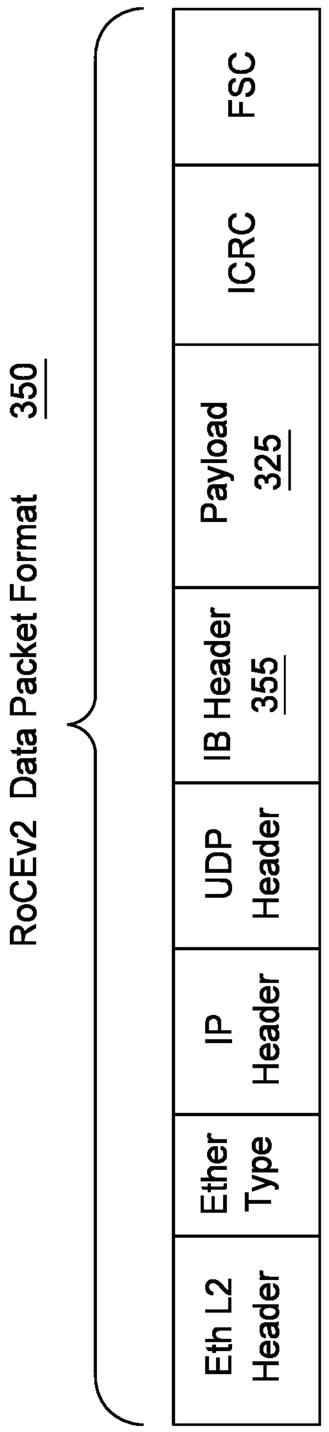

FIGS. 3A and 3B illustrate packet formats that combine atomic and data operations, according to an example. FIG. 3A illustrates a data packet format 300 using the InfiniBand interface or architecture. A Local Route Header (LRH) 305 identifies the local source and local destination ports where switches will route the packet. The LRH 305 can also specify a Service Level (SL) and virtual lane (VL) on which the packet travels. In one embodiment, the packet format 300 for InfiniBand always includes the LRH 305

A Global Route Header (GRH) 310 is present in a packet that traverses multiple subnets. The GRH 310 identifies the source and destination ports using a global identifier (GID) in the format of an IPv6 address. Routers forward the packet based on the content of the GRH 310. As the packet traverses different subnets, the routers modify the content of the GRH 310 and replace the LRH 305.

The transport layer protocol is responsible for segmenting an operation into multiple packets when the message's data payload is greater than the maximum transfer unit (MTU) of the path. The queue pair (QP) on the receiving end reassembles the data into the specified data buffer in its memory.

The Base Transport Header (BTH) 315 is present in all packets except for raw datagrams. BTH 315 specifies the destination QP and indicates the operation code, packet sequence number, and partition. The operation code identifies if the packet is the first, last, intermediate, or only packet of a message and specifies the operation (Send, remote direct memory access (RDMA) Write, Read, Atomic, etc.). The packet sequence number (PSN) is initialized as part of the communications establishment process and increments each time the QP creates a new packet. The receiving QP tracks the received PSN to determine if it lost a packet. For reliable service, the receiver sends an acknowledgment (ACK) or negative acknowledgment (NAK) packet back to notify the sender that packets were or were not received correctly.

There are various Extended Transport Headers (ETH) 320 conditionally present in a packet depending on the class of service and the operation code. For reliable datagram service, the ETH 320 identifies the end-to-end (EE) context that the QP uses to detect missing packets.

In one embodiment, the first message of an RDMA read or write operation contains an RDMA ETH 320 that specifies the virtual address, R_Key, and total length of the data buffer to read or write. Subsequent RDMA write packets provide the remainder of the data. The QP validates that the memory is properly registered for access by that QP and that the total data written does not overrun the length specified.

For an RDMA read operation, the QP fetches the data, segments it into read response packets and sends them to the originator. When receiving a RDMA response, the QP writes the data into the buffer specified in the work queue entries (WQE) of the RDMA read request.

An Atomic operation contains an Atomic ETH 320 that specifies the virtual address and R_Key of the memory location that is the object of the operation as well as two operands. The QP validates that the memory is properly registered for access by that QP. The QP fetches the data, returns that value to the originator, performs the operation, and writes the result back to memory. For the Compare & Swap data operation, the QP compares the content of the memory location with the first operand, and if they match, it writes the second operand to that same location. Otherwise, it does not modify it.

For the Fetch & Add data operation, the QP performs an unsigned add using the 64-bit Add Data field in the Atomic ETH 320, and writes the result back to the same memory location. In either case, the data operation is atomic such that another QP is not allowed to modify that memory location between the time of the read and the subsequent write.

A combined Atomic and Put (A+P) packet will use a new PutRange header in the ETH 320. The ETH 320 can hold different types of headers-Reliable Datagram, Datagram, RDMA. ATOMIC, ACK, etc. The ATOMIC header type (A) and the RDMA header type (P) are the types related to the embodiments herein. The ATOMIC header type can include a Virtual Address (VA) (e.g., 64 bits), R_Key (e.g., 32 bits), Swap (Add) Data (SwapDt) (e.g., 64 bits), and Compare Data (CmpDt) (e.g., 64 bits). The ATOMIC VA field (which is part of the ETH 320) will be used to specify an address for an atomic operation (or used to index into an atomic table).

The RDMA header type can include fields such as VA (e.g., 64 bits), R_Key (e.g., 32 bits), and DMA Length (DMAlen) (e.g., 32 bits)

The base virtual address field (which is part of the ETH 320) is used to specify the first memory word of a buffer (memory range) where the Put portion of the message may be placed. The actual placement will be determined with the help of the Atomic operation using an offset (as described in FIG. 2). The actual placement can be represented by:

Actual_Placement:=Base_Virtual_Address+Atomic_Return_Value

The Add Data field (which is part of the ETH 320) should contain the size of Put payload 325. For example, if the Put is 4 KB message, the Add Data field should pass on 4096 for the Atomic operation to consume.

ICRC 335 includes a cyclic redundancy check (CRC) value that provides end-to-end data integrity while VCRC 340 contains a CRC value that provides link level data integrity between two hops.

The I data (IDATA) field is immediate data. The RDMA write command has a mechanism to allow the IDATA field to be put into the Completion Queue Entry (CQE) as user specified data. The field can be used by the user to provide information about the completion-such as a unique identifier. (Note: CQEs is a user-visible resource that allows a user space application to be notified that a Work Request has been completed by the hardware.)

The RMDA write command will send the PAYLOAD to the remote memory and also it will then annotate the CQE with the IDATA (if IDATA is set).

FIG. 3B illustrates incorporating the headers and payload 325 in FIG. 3A into a RDMA over Converged Ethernet version 2 (RoCEv2) data packet format 350, where the IB header 355 can include the LRH 305, GRH 310, BTH 315, and ETH 320 in FIG. 3A. That is, FIG. 3B illustrate a packet format 350 for using InfiniBand with RoCE. For instance, FIG. 3B shows an InfiniBand Architecture (IBA) packet being "wrapped" with Ethernet metadata. The purpose is to tunnel Infiniband packets through an Ethernet fabric.

Figure 4A:
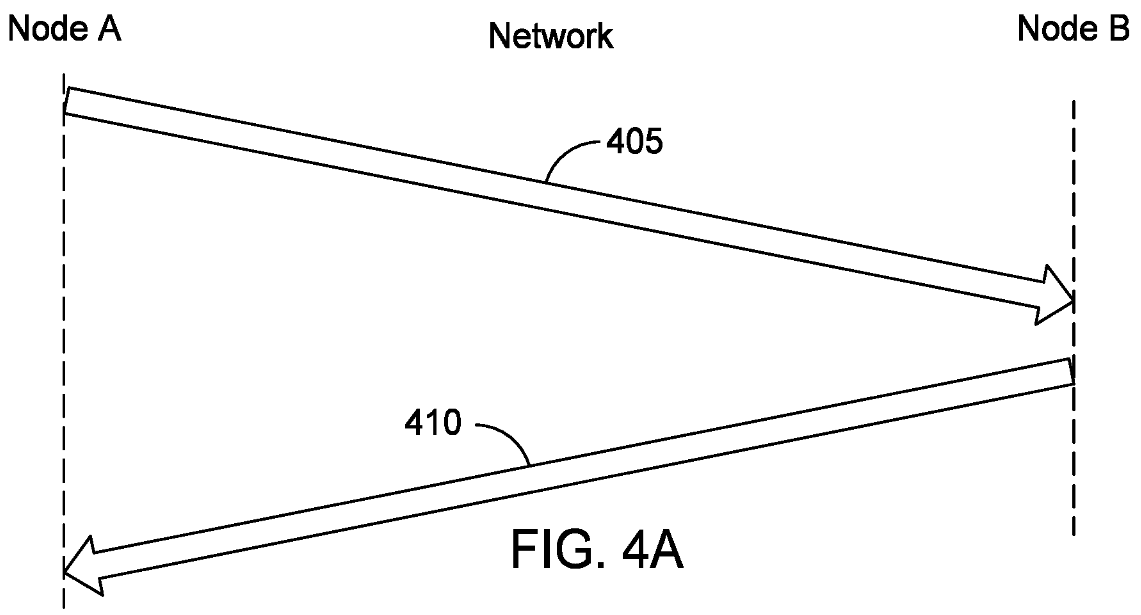
FIGS. 4A and 4B illustrate transmitting packets between nodes, according to an example.
Figure 4B:
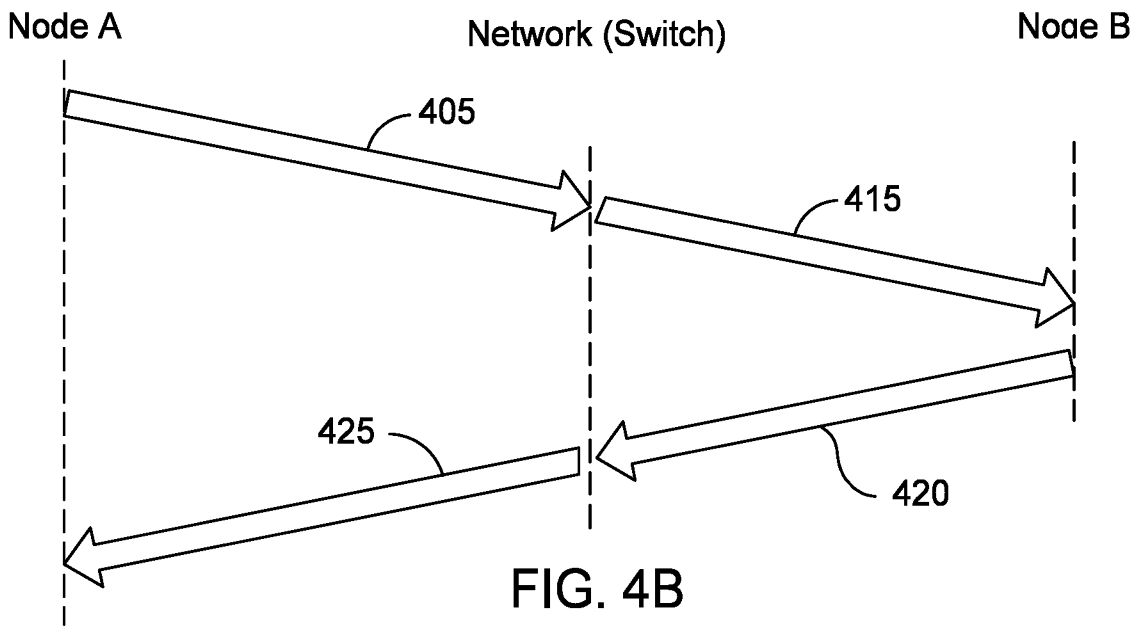

FIGS. 4A and 4B illustrate transmitting packets between nodes, according to an example. FIG. 4A illustrates Node A using a network (which can include any number of network switches) to transmit a packet 405 containing atomic and data operations to Node B. Using an atomic put operation as an example, when Node B receives the packet 405 it can determine whether the data is currently being used by a different node, and if not provide the lock to the data. This can be performed by a NIC (e.g., a SmartNIC) in Node B, or could be performed by the CPU on Node B. Once the lock is obtained, Node B can perform the Put operation.

If successful, Node B transmits a packet 410 to Node A indicating the combined atomic fetch and put operation was performed successfully. Thus, FIG. 4A illustrates transmitting packets through the network only twice, in contrast to prior solutions where first a lock is obtained and then acknowledged by Node B before the Node A transmits another packet with the data operation. This can require four packets traversing the network, thereby increasing the latency of the atomic Put operation substantially.

FIG. 4B illustrates another embodiment where the packet 405 containing the combined atomic and data operation is received at a network switch in the network. In one embodiment, the network switch is a central network switch in the network hierarchy so that every data path flows through the switch. In this example, the network switch performs the atomic operation on behalf of Node B (or any other node). This offloads the atomic operation from the nodes to the centralized switch. This frees computer resources in the nodes to perform other operation.

If the atomic is successful, e.g., Node A is given a lock on the buffer in Node B, the network switch transmits a packet 415 that contains the data operation to Node B. This packet 415 would not have an atomic operation since this was performed at the network switch. Node B can perform the data operation and then transmit a packet 420 to the network switch indicating the data operation was performed successfully. The network switch can release the lock on the data and transmit a packet 425 informing Node A that the atomic data operation was successful. The following figures provide more detail about performing the atomic operation at a network switch on behalf of an endpoint (e.g., Node B in the example in FIG. 4B).

Figure 5:
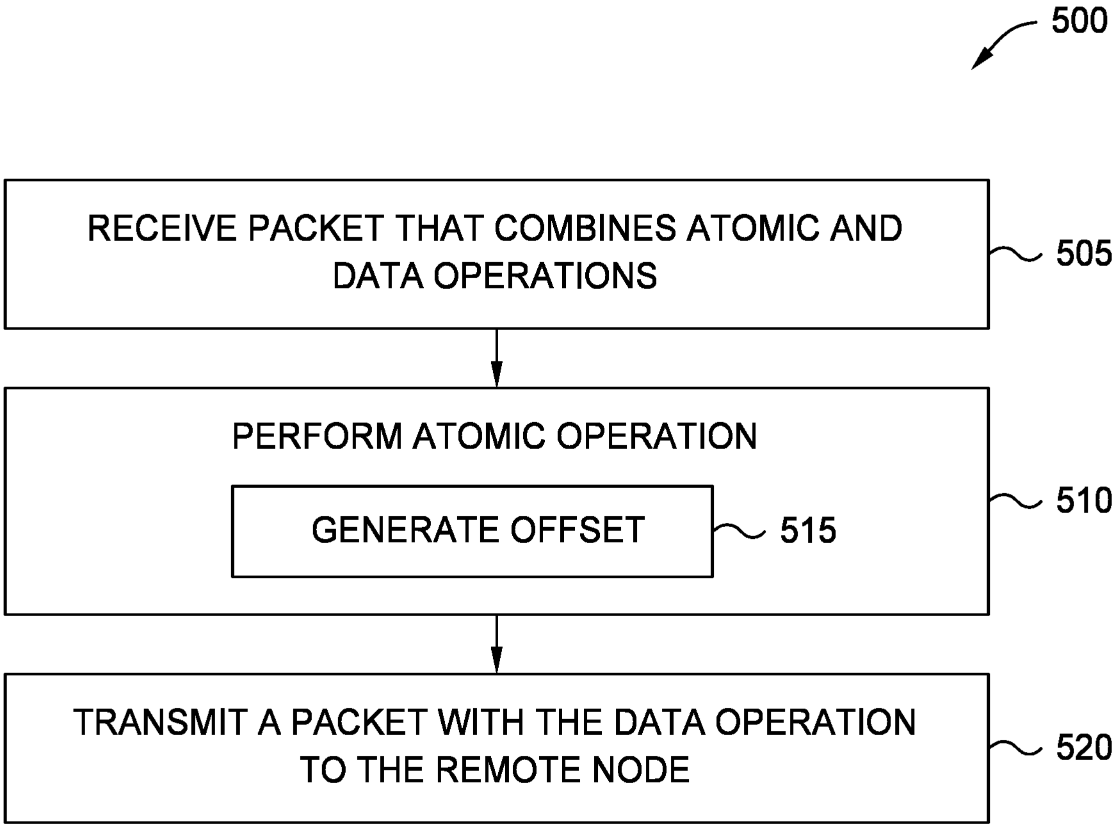
FIG. 5 is a flowchart for performing atomic operations at a network switch, according to an example.

FIG. 5 is a flowchart of a method 500 for performing atomic operations at a network switch, according to an example. At block 505, the network switch receives a packet that combines atomic and data operations, as discussed above.

At block 510, the network switch performs the atomic operation to generate a lock on the data associated with the atomic and data operations. As part of this, at block 515, the network switch generates an offset that is used to store (or read) the data associated with the data operation. In FIG. 2, the endpoint manages the offset; however, since in method 500 the network switch performs the atomic operation, it can save and update the offset for the data operation.

At block 520, the network switch transmits a packet with the data operation and the offset to the remote node. Because the network switch is centralized, it ensures that the data operation does not overwrite data that has already been stored in the buffer of the remote node using the offset. The network switch can update the offset according to the size of the data as discussed above. That way, when another atomic data operation is received, the network switch has the correct offset to prevent the new operation from reading the incorrect data or overwriting the data that was stored at the remote node in the previous data operation.

Figure 6:
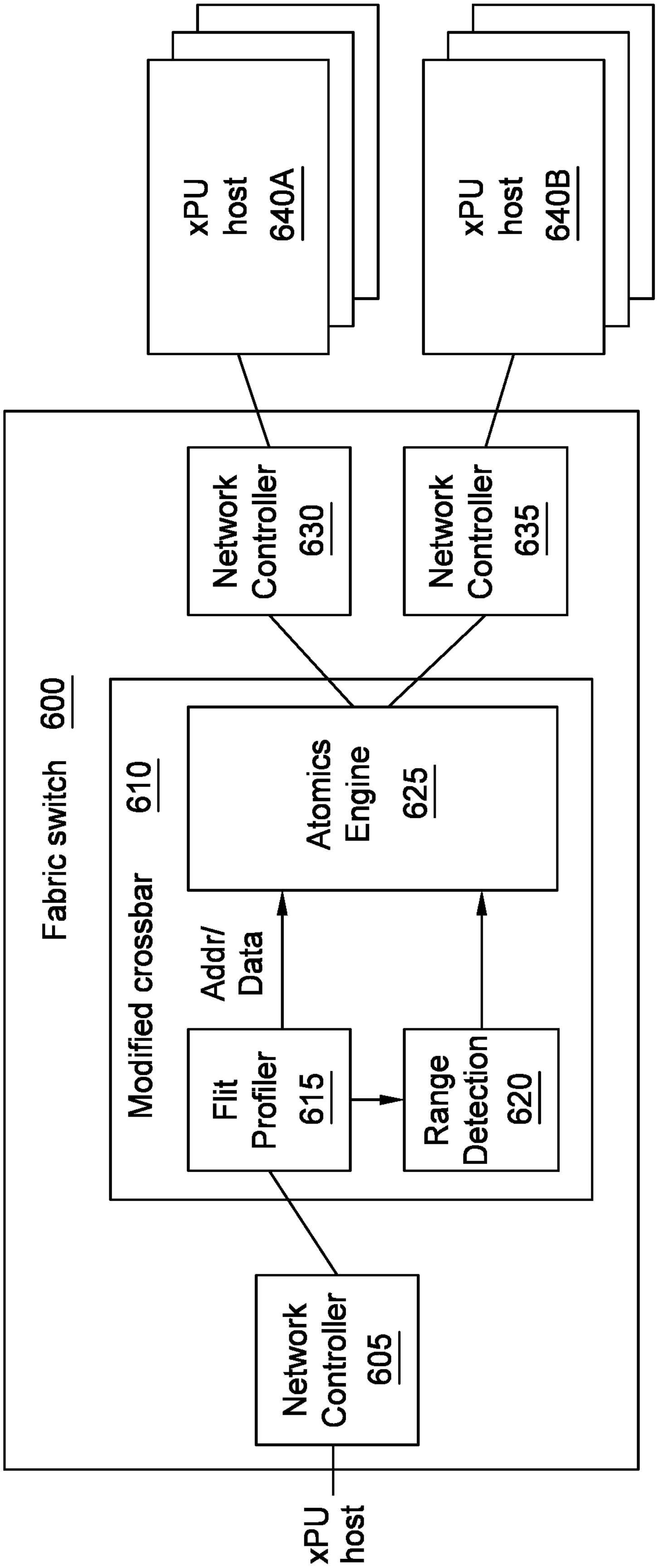
FIG. 6 illustrates a switch that performs atomic operations, according to an example.

FIG. 6 illustrates a switch 600 that performs atomic operations, according to an example. For example, the switch 600 can perform the atomic operations described in FIGS. 4B and 5. That is, the switch 600 can perform atomic operations on behalf of endpoints such as the xPU hosts 640.

The switch 600 includes a network controller 605 that receives packets and forwards them to a flit profiler 615 in a modified crossbar 610. The flit profiler 615 can include circuitry that evaluates the packet to determine whether it includes a combination of an atomic and data operation. In one embodiment, the flit profiler 615 parses opcode from the BTH (e.g., the BTH in FIG. 3B) to determine whether the packet includes an atomic operation. If not, the flit profiler 615 can forward the packet to one of the network controllers 630, 635 so it bypasses the other circuitry in the crossbar 610—i.e., a range detection circuit 620 and atomics engine circuit 625.

If the packet does include an atomic operation, the flit profiler 615 sends a destination address (AddDt) to the atomics engine circuitry 625 and sends RDMA virtual address (VA) (for the data operation) and ATOMIC virtual address (VA) (for the atomic operation) to the range detection circuit 620.

The range detection circuit 620 indexes into a table using the RDMA_VA and ATOMIC_VA values and a PROT_KEY to retrieve a ATOM_VARIABLE. The table can be used to indicate for what range of addresses atomics are performed. Assuming the packet corresponds to a range within the table, the ATOM_VARIABLE and the RDMA_VA are then forwarded to the atomics engine 625.

Using a Put operation as an example, the atomics engine 625 can update the packet payload with the RDMA_VA address and mark the atomic as complete in the packet payload. The atomics engine 625 can also create an ATOM_VARIABLE using the destination address received from the flit profiler 615 and write the ATOM_VARIABLE into a range table used by the range detection circuitry 620. The atomics engine 625 then sends the packet (e.g., a modified packet such as the packet 415 in FIG. 4B) to one of the network controllers 630, 635 and eventually to an endpoint (e.g., one of the xPU hosts 640). Note, after performing this operation the packet is equivalent to a RDMA write packet from here on out, and will not be treated as PutRangeETH (e.g., a combination of atomic and data operations).

Figure 7:
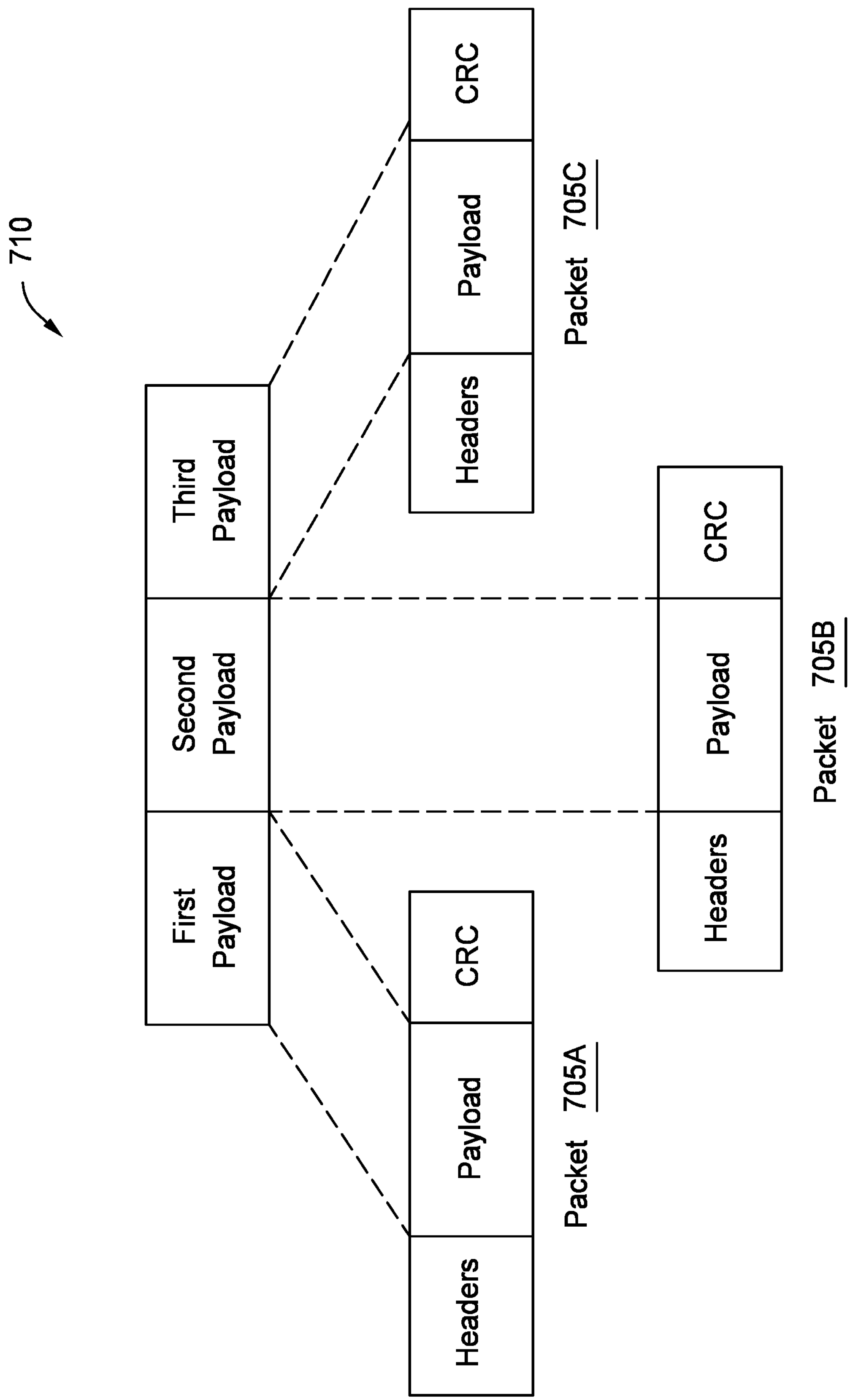
FIG. 7 illustrates combining packets at a network switch, according to an example.

FIG. 7 illustrates combining packets at a network switch, according to an example. For example, the switch 600 in FIG. 6 may combine multiple packets that are being sent to the same buffer at a destination node into one packet. In FIG. 7 (and potentially the other embodiments above), it is assumed that the ordering of the packets 705A-C does not matter. Thus, it does not matter whether the payload for packet 705A is stored in the buffer at the endpoint before the payloads 705B and 705C or vice versa.

The switch can receive the packets 705 (which indicate they contain a combination of atomic and data operations), obtain a lock, and then pull the payloads of the packet 705 corresponding to the data operations (e.g., the data that should be stored at the endpoint). These payload can then be placed into a combined packet 710 (or spread out over more than one packet) and sent to the endpoint by the switch.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A computing system, comprising:

one or more processors; and memory storing an application which, when executed by the one or more processors, performs an operation, the operation comprising:

generating a relaxed range for a data operation;

generating a packet that combines an atomic operation with the data operation; and transmitting the packet on a network, wherein the packet contains an extended transport header (ETH) indicating that the packet contains an atomic operation, and wherein the ETH comprises an add data field that indicates a size of the data operation in a payload of the packet.

2. The computing system of claim 1, wherein the relaxed range comprises a beginning address and an ending address related to a size of a payload of the data operation.

3. The computing system of claim 1, wherein the relaxed range comprises a tuple that includes a destination base address, a destination end address, and an ID of a destination node for the packet.

4. The computing system of claim 1, wherein the atomic operation obtains a lock of data associated with the data operation.

5. The computing system of claim 4, wherein the data operation is a put operation that stores data in a buffer at a destination node after the lock is obtained.

6. The computing system of claim 1, wherein the ETH further comprises an atomic virtual address that specifies an address for an atomic operation and a base virtual address that specifies a first memory word of a buffer where data should be read from, or written to, at a destination node.

7. A method, comprising:

generating a relaxed range for a data operation;

generating a packet that combines an atomic operation with the data operation, wherein the packet contains an extended transport header (ETH) indicating that the packet contains an atomic operation, and wherein the ETH comprises an add data field that indicates a size of the data operation in a payload of the packet; and transmitting the packet on a network.

8. The method of claim 7, wherein the relaxed range comprises a beginning address and an ending address related to a size of a payload of the data operation.

9. The method of claim 7, wherein the relaxed range comprises a tuple that includes a destination base address, a destination end address, and an ID of a destination node for the packet.

10. The method of claim 7, wherein the atomic operation obtains a lock of data associated with the data operation.

11. The method of claim 10, wherein the data operation is a put operation that stores data in a buffer at a destination node after the lock is obtained.

12. The method of claim 7, wherein the ETH further comprises an atomic virtual address that specifies an address for an atomic operation and a base virtual address that specifies a first memory word of a buffer where data should be read from, or written to, at a destination node.

13. A non-transitory computer readable storage medium comprising computer readable program code embodied therewith, the computer readable program code executable by one or more computer processors to perform an operation, the operation comprising:

generating a relaxed range for a data operation;

generating a packet that combines an atomic operation with the data operation, wherein the packet contains an extended transport header (ETH) indicating that the packet contains an atomic operation, and wherein the ETH comprises an add data field that indicates a size of the data operation in a payload of the packet; and transmitting the packet on a network.

14. The non-transitory computer readable storage medium of claim 13, wherein the relaxed range comprises a beginning address and an ending address related to a size of a payload of the data operation.

15. The non-transitory computer readable storage medium of claim 13, wherein the relaxed range comprises a tuple that includes a destination base address, a destination end address, and an ID of a destination node for the packet.

16. The non-transitory computer readable storage medium of claim 13, wherein the atomic operation obtains a lock of data associated with the data operation, wherein the data operation is a put operation that stores data in a buffer at a destination node after the lock is obtained.

17. The non-transitory computer readable storage medium of claim 13, wherein the ETH further comprises an atomic virtual address that specifies an address for an atomic operation and a base virtual address that specifies a first memory word of a buffer where data should be read from, or written to, at a destination node.

* * * * *